July 31, 1962    JEAN-PIERRE GAY    3,046,726
CHAIN OF CHESS-BOARD PATTERN
Filed Jan. 18, 1960
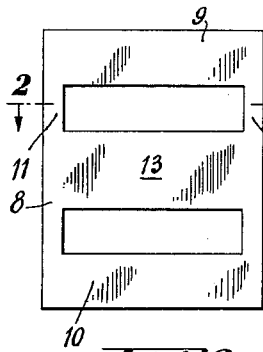
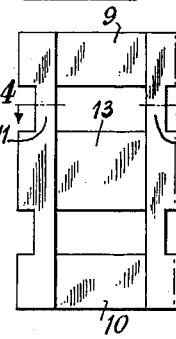
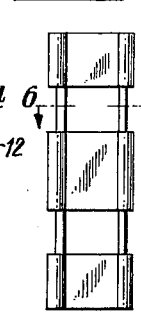
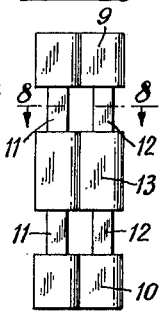
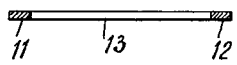
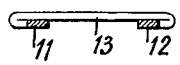
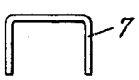
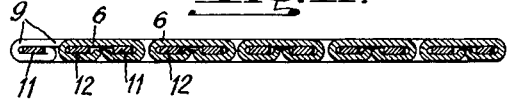
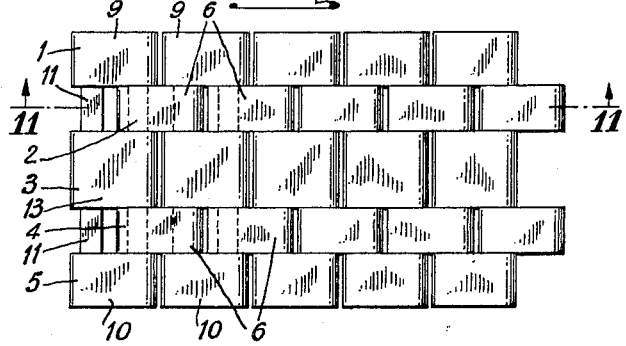
INVENTOR
JEAN-PIERRE GAY
BY Irwin S. Thompson
ATTY.

United States Patent Office 3,046,726
Patented July 31, 1962

3,046,726
CHAIN OF CHESS-BOARD PATTERN
Jean-Pierre Gay, Geneva, Switzerland, assignor to Gay Freres S.A., Geneva, Switzerland, a corporation of Switzerland
Filed Jan. 18, 1960, Ser. No. 3,067
Claims priority, application Switzerland Jan. 28, 1959
3 Claims. (Cl. 59—80)

The present invention has for object a chain of staggered parallel sections pivotally connected together of substantially uniform thickness and with a smooth and continuous rim over the whole length of the chain, which may constitute a bracelet or a collar for example and which is formed of hinged links of general rectangular shape and which is characterized in that it comprises a series of elements each formed of a rectangular metallic frame each of the two opposite sides of which have been folded over itself at least once, each of said elements extending over the whole width of the chain, with their parts thus folded disposed transversally relative to the length of the chain, and each forming, on the one hand, at least two links of a first kind, and, on the other hand, through parts of their transverse sides, at least one pair of connecting arms rigidly joining the said links one with the other, and in that is comprises a series of links of a second kind, each link joining two of said connecting arms belonging to two successive elements, the said arms forming pivots for the links of the second kind.

The accompanying drawing shows, by way of example, one embodiment of the chain object of the invention, when the same constitutes a bracelet.

FIG. 1 is a plan view of one of the elements before shaping.

FIG. 2 is a sectional view along 2—2 of FIG. 1.

FIGS. 3, 5, and 7 are views similar to FIG. 1 showing the element in three successive phases of shaping.

FIGS. 4, 6, and 8 are, respectively, sectional views along 4—4 of FIG. 3, 6—6 of FIG. 5, and 8—8 of FIG. 7.

FIG. 9 is a side view of a second bracelet element before shaping.

FIG. 10 is a plan view of a piece of a bracelet.

FIG. 11 is a longitudinal sectional view of the bracelet along 11—11 of FIG. 10.

The bracelet shown in FIGS. 10 and 11 is formed of five rows of links 1, 2, 3, 4, and 5, all having a general rectangular shape. The said links are connected by hinges, as will be described hereafter.

The rows 1, 3, and 5 are formed by means of a series of elements obtained as will be described with reference to FIGS. 1 to 8.

As regards the rows 2 and 4, they are formed of more simple elements, shown by 6 in FIG. 11 and which are each obtained from a piece 7 such as shown in FIG. 9.

In order to produce the elements forming the rows 1, 3, and 5, one starts with a piece forming a rectangular metallic frame 8 having two longitudinal edges 9, 10 of the same width and two narrower transverse edges 11, 12. A middle arm 13 connects, in this example, the transverse edges 11 and 12.

The finished element is visible in FIGS. 7 and 8 and, in order to obtain the same, one proceeds in the following manner:

One starts by folding each transverse edge 11, 12 a first time through 180°, as shown in FIGS. 3 and 4. Then one again folds the said edges through 90°, as shown in FIGS. 5 and 6 after which one continues to fold to 180° in order to bring the longitudinal edges 9, 10 of the original transverse edges 11 and 12 into the position wherein each longitudinal edge 9, 10 is twice folded over itself as shown in FIGS. 7 and 8.

The elements shown in FIGS. 7 and 8 extend over the whole width of the bracelet, as shown in FIG. 10. The transverse edges 11 and 12 extend transversally relative to the length of the bracelet. As regards the longitudinal edges 9, 10, and middle arm 13, they form three links of a first kind. The transverse edges 11 and 12 of the original frame form connecting arms rigidly joining together the said links 9, 10, and 13.

These different elements according to FIGS. 7 and 8, disposed parallel to each other, are connected two by two by links 6 of a second kind. It is these links 6 which form, as already explained, the rows 2 and 4. For the positioning of the said links 6, one takes U-shaped elements 7, then places them astride a connecting arm 11 of a link and a connecting arm 12 of the adjacent link, and one folds them to give them the shape visible in FIG. 11. Once thus placed, the said links 6 of the second kind each join two of the connecting arms 11, 12 belonging to two successive elements, the said arms forming hinged pivots for the links 6.

It will be seen that the chain described is of extremely simple manufacture, avoiding the mounting, necessary up to the present, of spindles for hinging the links.

According to a modification in the case of a chain having only three rows of links, the middle limb 13 (FIG. 1) would be eliminated. If, on the contrary, a chain of seven rows of hinges is desired, one will provide not one middle limb 13 but two intermediate limbs which will form not one, but two intermediate rows of links of the first kind. There will then be a total of four rows of links of the first kind and three rows of links of the second kind.

According to another modification, the folding could be stopped at the phase shown in FIGS. 3 and 4.

What I claim is:

1. A chain of staggered parallel sections pivotally connected together of substantially uniform thickness and with a smooth and continuous rim over the whole length of the chain, made of hinged links of rectangular shape, consisting of a series of elements forming links of a first kind and a series of links of a second kind, each one of said elements being formed as one single piece by a rectangular metallic frame made of one single sheet having central aperture means, each of two opposite sides of said frame being folded twice over itself so that the folded parts of each side are formed by superposed adjacent layers, said elements extending over the whole width of the chain, with their parts thus folded disposed transversally to the length of the chain, and each of said elements forming at least two links of said first kind which two links are integral with each other by means of said folded parts and spaced transversally of the chain length by means of said aperture means, the links of said second kind being each made of a rectangular metallic sheet, two opposite sides of which are folded one around one folded part of one of said elements and through its associated aperture means and the other one around one folded part of the neighboring one of said elements and through its associated aperture means, so that each link of said second kind joins together substantially pivotally two successive elements, whereby said folded parts of said elements for pivots for the links of said second kind.

2. A chain according to claim 1, wherein said frame has, before said first mentioned folding, two opposite sides the width of which is larger than that of the two other sides, the latter being those folded, whereas the said first two sides form, after said first mentioned folding, two links of said first kind.

3. A chain according to claim 1 wherein each of said elements forms three of the links of said first kind, two of these links lying at the border of the chain and the third of these links lying in the middle of the chain.

References Cited in the file of this patent

UNITED STATES PATENTS

| | | |
|---|---|---|
| 1,792,996 | Mason | Feb. 17, 1931 |
| 1,835,359 | Warner | Dec. 8, 1931 |
| 2,460,654 | Reinstein | Feb. 1, 1949 |
| 2,480,015 | Goode | Aug. 23, 1949 |

FOREIGN PATENTS

| | | |
|---|---|---|
| 34,826 | France | May 21, 1929 |
| 284,359 | Switzerland | Dec. 1, 1952 |
| 1,183,572 | France | Jan. 26, 1959 |